United States Patent [19]

Kato et al.

[11] Patent Number: 5,387,464
[45] Date of Patent: Feb. 7, 1995

[54] MAGNETIC RECORDING MEDIUM

[75] Inventors: Kazuo Kato; Kenichi Masuyama; Hiroaki Araki; Hiroshi Hashimoto, all of Kanagawa, Japan

[73] Assignee: Fuji Photo Film Co., Ltd., Kanagawa, Japan

[21] Appl. No.: 925,032

[22] Filed: Aug. 5, 1992

[30] Foreign Application Priority Data

Aug. 23, 1991 [JP] Japan ................... 3-212389

[51] Int. Cl.$^6$ ................................ G11B 5/00
[52] U.S. Cl. .................... 428/328; 428/329; 428/336; 428/423.3; 428/423.5; 428/423.7; 428/424.6; 428/425.9; 428/475.2; 428/476.3; 428/483; 428/522; 428/694 BU; 428/694 BS; 428/694 BM; 428/900
[58] Field of Search .............. 428/336, 423.3, 423.5, 428/423.7, 424.6, 425.9, 475.2, 476.3, 483, 522, 694, 900, 694 BU, 694 BS, 328, 329, 694 BM

[56] References Cited

U.S. PATENT DOCUMENTS

| | | | |
|---|---|---|---|
| 4,411,953 | 10/1983 | Miyoshi et al. | 428/336 |
| 4,504,542 | 3/1985 | Miyoshi et al. | 428/336 |
| 4,839,225 | 6/1989 | Matsufuji et al. | 428/336 |
| 4,963,433 | 10/1990 | Ogawa et al. | 428/323 |
| 5,055,352 | 10/1991 | Yamada et al. | 428/336 |
| 5,156,908 | 10/1992 | Araki et al. | 428/323 |

*Primary Examiner*—Stevan A. Resan
*Attorney, Agent, or Firm*—Sughrue, Mion, Zinn, Macpeak & Seas

[57] ABSTRACT

A magnetic recording medium is disclosed, comprising a non-magnetic support with an undercoating layer having formed thereon one or more magnetic layers. The undercoating layer contains a polyester resin or polyurethane resin having at least one polar group selected from the group consisting of —$SO_3M$, —$OSO_3M$, —$COOM$, and —$OPO_3M_2$ (wherein M represents a hydrogen atom, an alkali metal, or an ammonium base, and M in different polar group or plural M's within the same polar group may be the same or different), and a glass transition temperature (Tg) of from 40° C. to 80° C. The magnetic layer contains a binder resin having at least one polar group selected from the same group as defined above. The recording medium has excellent adhesion between the non-magnetic support and the magnetic layer, high running durability and excellent electromagnetic characteristics.

8 Claims, No Drawings

5,387,464

MAGNETIC RECORDING MEDIUM

FIELD OF THE INVENTION

This invention relates to a novel magnetic recording medium comprising a non-magnetic support and a magnetic layer with an undercoating layer provided therebetween.

BACKGROUND OF THE INVENTION

Magnetic recording media such as video tapes, audio tapes, and computer tapes generally comprise a non-magnetic support having provided thereon a magnetic layer comprising a binder having dispersed therein a ferromagnetic powder, e.g., a ferromagnetic iron oxide powder or a ferromagnetic alloy powder.

With the latest developments in high-density and long-play magnetic recording media, improvement in electromagnetic characteristics has been desired to meet ever increasing demands for higher image and/or sound quality. High-density recording requires magnetic recording media which provide achievement of high output and low noise, as well as improved reproducing (i.e., play back) and recording hardware such as a VTR. Possible approaches to high output include use of a ferromagnetic alloy powder having a high coercive force and a high saturation magnetization ($\sigma s$), use of a ferromagnetic powder having a reduced size to increase packing density of the magnetic layer, and improvement of the surface properties of the magnetic layer to minimize spacing loss on contact with a magnetic head. Possible approaches to long-play include reduction of thickness of the magnetic layer or of the non-magnetic support.

Past proposals for improving image or sound quality include size reduction of a Co-containing iron oxide powder, use of a ferromagnetic alloy fine powder, and use of a multi-layered magnetic layer in which an upper magnetic layer contains a ferromagnetic alloy powder and a lower magnetic layer contains a ferromagnetic iron oxide fine powder to provide improved electromagnetic characteristics over a broad frequency range. Each of these techniques require uniform dispersion of the fine particles of a ferromagnetic powder. To meet this requirement, various studies have been conducted relating to the binder for use in the magnetic layer. For example, the binder proposed in JP-A-59-5424 (the term "JP-A" as used herein means an "unexamined published Japanese patent application") contains a resin having at least one polar group selected from $-SO_3M$, $-O-SO_3M$, $-COOM$, and $-OPO_3M_2$, wherein M represents a hydrogen atom, an alkali metal, or an ammonium base (the plural M's may be the same or different), to improve dispersibility or the degree of packing of a ferromagnetic powder. On the other hand, size reduction of a ferromagnetic powder or improvement in surface properties of a magnetic layer tends to deteriorate running durability, such as clogging of a magnetic head. Consequently, it has been proposed to harden the magnetic layer by crosslinking the polar group with an isocyanate compound or by incorporating therein polyurethane having a high urethane bond concentration.

On the other hand, while polyethylene terephthalate is widely employed as a non-magnetic support for these magnetic recording media, the use of polyethylene naphthalate, polyamide, etc. has recently been extended as a thin and hard base suitable for long playing. Any one of these resin films is stretched to have high crystallinity, and thereby provides excellent organic solvent resistance and mechanical strength.

A magnetic layer obtained by coating a magnetic coating composition containing the above-described binder on a non-magnetic support has a high modulus of elasticity due to the high packing density of a ferromagnetic powder. However, since the magnetic layer has numerous microvoids unlike composite materials in general, it has a small elongation at break and has insufficient mechanical strength against large deformation. Therefore, a magnetic layer coated directly on a non-magnetic support without an undercoating layer therebetween is apt to be broken upon application of force. Besides, a magnetic layer with microvoids has poor adhesion to a non-magnetic support. The easiest and most effective solution to these problems is to provide an undercoating layer typically employed with general coatings.

With respect to an undercoating layer, compositions for an undercoating layer are disclosed in JP-B-47-22071 (the term "JP-B" as used herein means an "examined Japanese patent publication") JP-B-49-10243, JP-A-52-42703, and JP-A-59-19230. In particular, undercoating layer compositions containing a polyester resin considered to have excellent adhesion to polyethylene terephthalate are disclosed in JP-B-62-37451, JP-A-60-11358, JP-A-60-19522, JP-A-60-21250, and JP-A-61-2654510. Furthermore, JP-A-1-245421 discloses a specific structure of a polyester resin for use in an undercoating layer. However, none of the known undercoating layers exhibits satisfactory adhesion in the case where a magnetic layer coated thereon having an increased modulus of elasticity and increased hardness for improvement of running durability, or an increased packing density of the ferromagnetic powder and thereby increased hardness for improvement of electromagnetic characteristics is used, or in the case where a hard non-magnetic support, such as polyethylene naphthalate or polyamide is used.

SUMMARY OF THE INVENTION

An object of the present invention is to provide a magnetic recording medium having excellent adhesion between a non-magnetic support and a magnetic layer, while exhibiting high running durability and excellent electromagnetic characteristics.

The above object of the present invention is accomplished by a magnetic recording medium comprising a non-magnetic support having provided thereon at least one magnetic layer comprising a ferromagnetic powder dispersed in a binder and an undercoating layer disposed between the non-magnetic support and the at least one magnetic layer, wherein the undercoating layer contains a polyester resin or polyurethane resin having at least one polar group selected from the group consisting of $-SO_3M$, $-OSO_3M$, $-COOM$, and $-OPO_3M_2$ (wherein M represents a hydrogen atom, an alkali metal, or an ammonium base, and M in different polar groups or plural M's within the same polar group may be the same or different) and a glass transition temperature (Tg) of from 40° to 80° C.; and the magnetic layer contains a binder resin having at least one polar group selected from the group consisting of $-SO_3M$, $-OSO_3M$, $-COOM$, and $-OPO_3M_2$, wherein M is as defined above.

In a preferred embodiment of the present invention, the magnetic recording medium comprises a plurality of magnetic layers each containing at least one of the above-described polar groups. More preferably, the uppermost magnetic layer among the plurality of magnetic layers contains a ferromagnetic alloy powder, while the lowermost magnetic layer among the plurality of magnetic layers contains a Co-containing iron oxide powder. In a particularly preferred embodiment, the non-magnetic support is selected from the group consisting of polyethylene terephthalate, polyethylene naphthalate and polyamide.

The present inventors found that a polyester or polyurethane resin having a specific polar group selected from the above-described groups, when coated as an undercoating layer, improves adhesion between a non-magnetic support and the undercoating layer. The present inventors also found that a binder resin having a specific polar group selected from the same groups, when incorporated in a magnetic layer, improves adhesion between the undercoating layer and the magnetic layer. Where a magnetic recording medium has a multilayer structure, sufficient adhesion among the plural magnetic layers must be established. In this case, the present inventors found that it was preferable to incorporate such a polar group-containing binder resin into each of the plural magnetic layers for obtaining improved adhesion therebetween.

While the improvement in adhesion of an undercoating layer to a non-magnetic support is accompanied at the expense of deterioration of an anti-blocking property, this problem can be solved by controlling the glass transition temperature (Tg) of the undercoating layer resin. If the Tg of the resin of the undercoating layer is too low, the blocking tendency becomes appreciable. If the Tg is too high, solubility in a solvent is reduced. The glass transition temperature which satisfies both anti-blocking and solvent-solubility while exhibiting sufficient adhesion ranges from 40° to 80° C.

The resin having the above-described specific polar group for use as a binder of a magnetic layer exhibits increased adsorption onto a ferromagnetic powder due to the polar group. As a result, dispersibility and packing degree of the magnetic powder and surface properties of the magnetic layer are improved, leading to excellent electromagnetic characteristics.

Considering that a magnetic recording medium having poor adhesion generally undergoes delamination (peeling at the interface between a non-magnetic support and an undercoating layer or between an undercoating layer and a magnetic layer, to leave almost no magnetic layer on the peeling surface) while a magnetic recording medium having good adhesion generally undergoes cohesive failure (breakage which takes place below the surface of a magnetic layer and close to an undercoating layer, leaving a portion of the magnetic layer on the peeling surface), the present inventors searched for an undercoating layer-forming material having enhanced adhesion between an undercoating layer and a non-magnetic support and enhanced adhesion between an undercoating layer and a magnetic layer in good balance. As a result, the present inventors discovered that polyester and polyurethane resins each having the above-described polar group effectively enhance adhesion between a non-magnetic support and an undercoating layer formed thereon, and that use of a binder resin having the same polar group as in the polyester or polyurethane resin in a magnetic layer adjacent to the undercoating layer provides enhanced resistance against delamination.

Accordingly, the magnetic recording medium of the present invention has improved running durability, for example, improved resistance to edgewise abrasion. Furthermore, the presence of the specific polar group in the magnetic layer improves dispersibility of a ferromagnetic powder to provide improved degree of packing and surface properties, which in turn leads to excellent electromagnetic characteristics. When the magnetic recording medium has a plurality of magnetic layers, electromagnetic characteristics and running properties are further improved.

The magnetic recording medium of the present invention comprises a non-magnetic support having formed thereon at least one magnetic layer comprising a binder resin having dispersed therein a ferromagnetic powder and an undercoating layer disposed therebetween.

DETAILED DESCRIPTION OF THE INVENTION

The non-magnetic support for use in the present invention is conventional. Examples of suitable non-magnetic supports include synthetic resin films (e.g., a polyethylene terephthalate film, a polypropylene film, a polycarbonate film, a polyethylene naphthalate film, a polyamide film, a polyamideimide film, and a polyimide film); and metallic foils (e.g., an aluminum foil and a stainless steel foil). Among these, a polyethylene terephthalate film, a polyethylene naphthalate film and a polyamide film are preferred. The non-magnetic support generally has a thickness of from 2.5 to 100 μm, and preferably from 3 to 80 μm.

As discussed above, adhesion of a magnetic layer to a non-magnetic support is reduced as the magnetic layer is hardened for obtaining a high packing density of the ferromagnetic powder, or for improving durability of the super-smooth surface thereof to meet recent demands for high-density recording. Similarly, where a polyethylene naphthalate film or a polyamide film is used as a non-magnetic support for long-play tapes, in which films have sufficient strength even when the thickness thereof is reduced, sufficient adhesion cannot be obtained due to the hardness of the film.

Under these circumstances, the present inventors have conducted extensive research to develop an undercoating layer exhibiting excellent adhesion to both a non-magnetic support made of polyethylene terephthalate, polyethylene naphthalate, polyamide, etc. and a magnetic layer. A marked improvement in adhesion was obtained by using an undercoating layer comprising a polyester resin or polyurethane resin having a specific polar group as hereinafter described in detail.

The polar group according to the present invention is selected from the group consisting of —SO$_3$M, —OSO$_3$M, —COOM and —OPO$_3$M$_2$, wherein M represents a hydrogen atom, an alkali metal or an ammonium base, and M in different polar groups or plural M's within the same polar group may be the same or different.

The polyester resin having a specific polar group for use in the present invention is synthesized from an alcohol component (e.g., ethylene glycol, diethylene glycol, triethylene glycol, and tetraethylene glycol) and a dibasic acid component, containing a specific polar group (e.g., a mixture of an aromatic dicarboxylic acid (e.g., orthoterephthalic acid, isophthalic acid, and terephthalic acid) and a polar group-containing phthalic acid).

The polyurethane resin having a specific polar group for use in the present invention is synthesized from a polyisocyanate compound and a polyol component, e.g., a polyester polyol obtained by reacting a polyol and a polybasic acid. A polar group can be introduced into the polyurethane by using a polybasic acid or polyol having a polar group as a part of the polybasic acid or polyol, and reacting the resulting polar group-containing polyester polyol and a polyisocyanate compound.

Examples of the polar group-containing polybasic acid or polyol include 5-sulfoisophthalic acid, 2-sulfoisophthalic acid, 4-sulfophthalic acid, 3-sulfophthalic acid, a dialkyl 5-sulfoisophthalate, a dialkyl 2-sulfophthalate, an alkyl 4-sulfophthalic acid, an alkyl 3-sulfophthalic acid, and a sodium or potassium salt of these compounds; and dimethylolpropionic acid and its sodium or potassium salt.

A polar group content in the polyester or polyurethane resin ranges preferably from 0.1 to 3 meq/g. A preferred molecular weight of the polyester or polyurethane resin is from 10,000 to 100,000, and more preferably from 30,000 to 60,000. A polar group content that is too high or a molecular weight that is too high results in a reduction of solvent-solubility. The Tg of the polar group-containing polyester or polyurethane resin ranges from 40° to 80° C. The Tg of the resin can be controlled by adjustment of the ratio of the alcohol component to the dibasic acid component. If the Tg is lower than 40° C., blocking occurs during the production process.

The magnetic layer formed on the above-described undercoating layer contains a binder resin having at least one polar group selected from the group consisting of —SO₃M, —OSO₃M, —COOM and —OPO₃M₂, wherein M is as defined above. Furthermore, the polar group of the undercoating layer may be different from the polar group of the magnetic layer. When the magnetic recording medium comprises a plurality of magnetic recording layers, the magnetic layer adjacent to the undercoating layer of the plural magnetic layers preferably contains a binder resin having at least one of these polar groups, and particularly all of the plural magnetic layers preferably contain a binder resin having at least one of these polar groups.

While a conventional undercoating layer loses its adhesive property as the magnetic layer increases in thickness, the combined use of the above-described polar group-containing polyester or polyurethane resin in the undercoating layer and the above-described polar group-containing binder resin in the magnetic layer brings about a remarkable improvement in adhesion and, at the same time, reduces dependence of adhesion on thickness of the magnetic layer to thereby obtain stable adhesion.

The magnetic recording medium of the present invention having the above-described structure provides excellent adhesion of the undercoating layer to both of the non-magnetic support and the magnetic layer to thereby exhibit improved running durability, such as edgewise abrasion resistance of the magnetic layer. Furthermore, since the presence of the specific polar group in the magnetic layer improves dispersibility of a magnetic powder, the packing degree and surface properties of the magnetic layer are improved, leading to excellent electromagnetic characteristics. When the magnetic recording medium comprises a plurality of magnetic recording layers, the electromagnetic characteristics and running properties are further enhanced.

In addition to the polar group-containing polyester or polyurethane resin, the undercoating layer may further contain conventional resins (in an amount of from 0 to 20% by weight), such as thermoplastic resins, e.g., a vinyl chloride-vinyl acetate copolymer, a copolymer of vinyl chloride, vinyl acetate, vinyl alcohol, maleic acid and/or acrylic acid, a vinyl chloride-vinyl propionate copolymer, a vinyl chloride-vinylidene chloride copolymer, a vinyl chloride-acrylonitrile copolymer, an ethylene-vinyl acetate copolymer, cellulose derivatives (e.g., nitrocellulose resins, cellulose nitrate, and cellulose acetate propionate), an acrylic resin, a nylon-silicone resin, a polyamide resin, polyvinyl fluoride, a vinylidene chloride-acrylonitrile copolymer, a styrene-butadiene copolymer, a polyvinyl acetal resin, a polyvinyl butyral resin, an epoxy resin, a phenoxy resin, a polyester resin (not containing a polar group), a polyurethane resin (not containing a polar group), a chlorovinyl ether-acrylic ester copolymer, an amino resin, and various synthetic rubbers. It is particularly preferred to use the polyester resin (not containing a polar group) alone or in combination with the polyurethane resin (not containing a polar group).

A hardening agent for use in the present invention includes polyisocyanate compounds usually employed in the preparation of polyurethane resins. Examples of suitable hardening agents are, e.g., reaction products of 3 mols of a diisocyanate compound, e.g., tolylene diisocyanate and xylylene diisocyanate, and 1 mol of trimethylolpropane, and polymethylene polyphenylisocyanates. The hardening agent is preferably used at a resinous component to hardening agent ratio of from 9:1 to 5:5 by weight.

Organic solvents for use in dissolving the undercoating layer resin for the preparation of an undercoating layer coating composition include those capable of dissolving the polyester or polyurethane resin having a polar group, such as ketones (e.g., methyl ethyl ketone, methyl isobutyl ketone, and cyclohexanone), tetrahydrofuran, methyl cellosolve, and chlorinated hydrocarbons (e.g., methylene chloride, ethylene chloride, chloroform, and ethylene chlorohydrin). Preferred among them are cyclohexanone or a mixture of cyclohexanone and methyl ethyl ketone or methyl isobutyl ketone.

If desired, the coating composition for an undercoating layer may further contain additives, such as antistatic agents, e.g., carbon black, pigments, e.g., nigrosine; and surface active agents.

The coating composition for the undercoating layer mainly comprising the above-described resinous components and solvent is coated on the surface of a non-magnetic support, preferably to a dry thickness of not more than 0.3 μm, and more preferably to a dry thickness of from 0.01 to 0.1 μm. If the undercoating layer thickness exceeds 0.3 μm, it is difficult to obtain a smooth surface. If the undercoating layer thickness is less than 0.01 μm, an effect sufficient for relaxing stress concentration is not sufficiently obtained, and the adhesion tends to be reduced.

On the thus-formed undercoating layer is further provided one or more magnetic layers comprising a binder resin having dispersed therein a ferromagnetic powder.

The ferromagnetic powder for use in the present invention is a ferromagnetic powder and examples of the ferromagnetic powder include ferromagnetic iron oxides, Co-containing ferromagnetic iron oxides, ferromagnetic chromium dioxide powder, a ferromagnetic alloy powder, barium ferrite, ferromagnetic iron carbide, and ferromagnetic iron nitride. Preferred among them are Co-containing ferromagnetic iron oxides and a ferromagnetic alloy powder. The Co-containing iron oxide include Co-modified iron oxides, e.g., Co-doped or Co-dissolved iron oxide and Co-coated iron oxide, and the iron oxide to be Co-modified includes $FeO_x$ ($1.33 \leq x \leq 1.5$).

The Co-containing iron oxide powder preferably has an average length in the long axis of not more than 0.25 μm, an acicular ratio of not more than 10, and a BET specific surface area ($S_{BET}$) of not less than 35 m²/g. If the BET specific surface area ($S_{BET}$) is less than 35 m²/g, the packing degree tends to be reduced, and the magnetic flux density is thereby reduced. Besides, because such particles are not sufficiently fine, the surface of the magnetic layer is not sufficiently smoothened, and the electromagnetic characteristics tend to be considerably reduced. For the same reason, the powders preferably have a crystallite size of less than 350 Å. Furthermore, the Co-containing iron oxide preferably has a coercive force of from 600 to 1500 Oe.

The ferromagnetic alloy powder includes powder of alloys containing iron, cobalt or nickel, and powder of iron nitride. The alloys have a metallic content of at least 75% by weight, and not less than 80% by weight of the metallic content comprises a ferromagnetic alloy (i.e., Fe, Co, Ni, Fe—Ni, Co—Ni, Fe—Co—Ni). The metallic content may contain less than 20% by weight of other components, e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, and P. Preferred of these ferromagnetic alloy powders are those containing Al and/or Si. Furthermore, the ferromagnetic alloy powder may contain a small amount of water, a hydroxide or an oxide.

In using the ferromagnetic alloy powder as a ferromagnetic powder, the shape of the particles is not particularly limited but is usually acicular, granular, ellipsoidal dice-like or plate-like. In general, a metallic powder undergoes rapid oxidation on contact with air. Therefore, it is preferable to stabilize the ferromagnetic alloy powder by gradual oxidation to forman oxide layer on the surface thereof. Gradual oxidation can be carried out by, for example, by immersing a metal powder in an organic solvent in an inert gas and then evaporating the solvent in air, and by passing a mixed gas of oxygen and an inert gas at a low oxygen partial pressure through an inert gas while gradually increasing the oxygen partial pressure and finally passing air.

The ferromagnetic alloy powder preferably has a coercive force of from 600 to 5000 Oe, and particularly from 1000 to 2000 Oe. If the coercive force is less than about 600 Oe, the electromagnetic characteristics in the short wavelength region would be reduced. The ferromagnetic alloy powder preferably has a BET specific surface area ($S_{BET}$) of not less than 40 m²/g, an average length in the long axis length of not more than 0.25 μm, an acicular ratio of not more than 10, and a crystallite size of from 150 Å to 250 Å. When these conditions are not satisfied, noise is increased, resulting in a reduction in C/N.

For the purpose of obtaining excellent electromagnetic characteristics and running durability, the magnetic recording medium may comprise a plurality of (e.g., 2, 3 or more) magnetic layers. In this case, two or more different kinds of the above-described ferromagnetic powders may be appropriately selected and distributed among the plural magnetic layers. A ferromagnetic alloy powder is preferably used in the uppermost layer and a ferromagnetic iron oxide such as a Co-containing iron oxide in the lowermost layer. The lower layer may contain a non-magnetic inorganic powder, e.g., $TiO_2$, red oxide ($Fe_2O_3$), Zinc oxide (ZnO), and $Al_2O_3$, as a main component.

Binder resins for use in the magnetic layer include vinyl chloride-based copolymers, vinylidene chloride-based copolymers, polyester resins, acrylic resins, polyvinyl acetal resins, polyvinyl butyral resins, phenoxy resins, epoxy resins, butadiene-acrylonitrile copolymers, polyurethane resins, and urethane-epoxy resins. These resins may be used either individually or in combination thereof.

At least one of the binder resins constituting the magnetic layer comprises a repeating unit containing at least one polar group selected from the group consisting of —$SO_3M$, —$OSO_3M$, —COOM, and —$OPO_3M_2$, wherein M is as defined above.

Of the above-enumerated binder resins, a combination of a polyurethane resin and a vinyl chloride-based copolymer is preferred. In using these resins, at least one of them preferably comprises a repeating unit containing the above described polar group.

Where a vinyl chloride-based copolymer containing the polar group is used, the polar group may be present in two or more different repeating units, and one repeating unit may contain two or more different polar groups. In particular, a vinyl chloride-based copolymer comprising a repeating unit containing —$OSO_3K$ and/or a repeating unit containing —COOH is preferred.

The content of the repeating unit containing a polar group in the vinyl chloride-based copolymer ranges from 0.001 to 5.0 mol %, preferably from 0.01 to 5.0 mol %, and more preferably from 0.05 to 3.0 mol %. If the content of the repeating group containing a polar group is less than 0.001 mol %, dispersibility of the ferromagnetic powder tends to be reduced. If it exceeds 5.0 mol %, the copolymer exhibits hygroscopicity, and weather resistance of the resulting magnetic recording medium tends to be reduced.

The vinyl chloride-based copolymer containing a polar group preferably further comprises a repeating unit containing an epoxy group. An epoxy group in the copolymer serves to suppress the progress of dehydrochlorination of the vinyl chloride-based copolymer with time to thereby stabilize the copolymer. A preferred epoxy-containing repeating unit content in the copolymer is from 1 to 30 mol %. A preferred molar ratio of the epoxy-containing repeating unit to a vinyl chloride repeating unit ranges from 0.01 to 0.5, and preferably from 0.01 to 0.3.

The vinyl chloride-based copolymer generally has a number average molecular weight of from 10,000 to 200,000, preferably of from 10,000 to 100,000, and more preferably of from 15,000 to 60,000.

The above-described polar group-containing vinyl chloride-based copolymer may be prepared by copolymerizing a vinyl chloride monomer and a comonomer having a reactive double bond, e.g., 2-(meth)acrylamide-2-methylpropanesulfonic acid, vinylsulfonic acid or an alkali metal salt thereof, (meth)acrylic acid-2-ethyl sulfonate or an alkali metal salt thereof, maleic acid, maleic anhydride, (meth)acrylic acid, and (meth)a- crylic acid-2-phosphate, in a usual manner known in the art.

An epoxy group can be introduced by using a comonomer having a reactive double bond and an epoxy group in the molecule thereof, e.g., glycidyl (meth)acrylate.

The polar group-containing vinyl chloride-based copolymer can also be prepared by previously preparing a hydroxyl-containing vinyl chloride-based copolymer and reacting the hydroxyl group of the copolymer with a compound having a polar group and a chlorine atom (e.g., monochloroacetic acid, or epichlorohydrin for introduction of an epoxy group) to carry out dehydrochlorination.

The vinyl chloride-based copolymer may further comprise repeating units derived from other comonomers as far as the characteristics of the vinyl chloride-based copolymer are not impaired. Useful examples of such other comonomers are vinyl ethers, α-monoolefins, acrylic esters, unsaturated nitriles, aromatic vinyl compounds, and vinyl esters.

Specific examples of the above-described polar group-containing vinyl chloride copolymers include "MR-110" produced by Japanese Zeon Co., Ltd.

Where a polyurethane resin containing a polar group is used as a binder resin, the polar group described above may be present in two or more different repeating units, and one repeating unit may contain two or more different polar groups. In particular, a polyurethane resin comprising a repeating unit containing —SO$_3$Na and/or a repeating unit containing —COOH is preferred.

The content of the repeating unit containing a polar group in the polyurethane resin usually ranges from 0.001 to 5.0 mol %, preferably from 0.01 to 5.0 mol %, and more preferably from 0.01 to 2.0 mol %. If it is less than 0.001 mol %, dispersibility of the ferromagnetic powder tends to be reduced. If it exceeds 5.0 mol %, the polyurethane resin exhibits hygroscopicity, and weather resistance of the resulting magnetic recording medium tends to be reduced.

In general, polyurethane resins are synthesized from a polyisocyanate compound and a polyol component, and, as a polyol component, a polyester polyol obtained by the reaction between a polyol and a polybasic acid is generally used. The polar group-containing polyurethane resin for use in the magnetic layer of the present invention can be prepared using this known process. Particularly a polar group can be introduced into the polyurethane by using a polybasic acid or polyol having a polar group as a part of the polybasic acid or polyol component, and then reacting the resulting polar group-containing polyester polyol with a polyisocyanate compound in a manner known to those of ordinary skill in the art.

Examples of the polar group-containing polybasic acid or polyol include 5-sulfoisophthalic acid, 2-sulfoisophthalic acid, 4-sulfophthalic acid, 3-sulfophthalic acid, a dialkyl 5-sulfoisophthalate, a dialkyl 2-sulfophthalate, an alkyl 4-sulfophthalate, an alkyl 3-sulfophthalate, and a sodium or potassium salt of these compounds; and dimethylolpropionic acid and its sodium or potassium salt.

The polyol or polybasic acid component not containing a polar group for use in the preparation of the polar group-containing polyester polyol is not particularly limited, and any of commonly employed compounds can be used.

The reaction between the polyol component and the polybasic acid compound can be carried out in a known manner.

The thus-obtained polyester polyol generally has a number average molecular weight of from 500 to 8,000.

The polyisocyanate compound for reaction with the polyester polyol is conventional in the art.

The polyurethane resin has a number average molecular weight usually of from 10,000 to 200,000, and preferably of from 15,000 to 60,000.

The polar group-containing polyurethane resin may also be prepared by previously preparing a hydroxyl-containing polyurethane resin and then introducing a polar group therein by reaction between the hydroxyl group and a compound having a polar group and a chlorine atom (e.g., monochloroacetic acid).

Specific examples of the above-described polar group-containing polyurethane resin include "UR-4300", "UR-5500", "UR-8300", and "UR-8600", all produced by Toyobo Co., Ltd.

Where the above-described vinyl chloride-based copolymer and polyurethane resin are used in combination as binder resins of the magnetic layer, they are generally used at a former to latter weight ratio of from 35:65 to 80:20, and preferably of from 40:60 to 70:30. When these two resins are used either individually or in combination thereof, dispersibility of the ferromagnetic powder tends to be improved over the case where other binder resins are used. This tendency is particularly appreciable when using these two resins in combination.

In a particularly preferred embodiment, the binder of the magnetic layer is a hardened product obtained by adding a polyisocyanate compound to the above-described vinyl chloride-based copolymer and polyurethane resin. The polyisocyanate compound to be added as a hardening agent is not particularly limited and includes, for example, a reaction product of 3 mols of a diisocyanate compound (e.g., diphenylmethane-4,4'-diisocyanate, tolylene diisocyanate and xylylene diisocyanate) and 1 mol of trimethylolpropane; a biuret adduct compound of 3 mols of hexamethylene diisocyanate; an isocyanurate adduct compound of 3 mols of tolylene diisocyanate and 2 mols of hexamethylene diisocyanate; and a polymer of diphenylmethane diisocyanate.

The polyisocyanate compound is used in an amount not more than an equivalent to the above-described polyurethane resin.

When the polyurethane resin, the vinyl chloride-based copolymer, and the polyisocyanate compound are used in combination, the polyisocyanate compound forms a three-dimensional crosslinked structure over the polyurethane resin and the vinyl chloride-based copolymer to provide a strong binder.

The magnetic layer may further contain additives, such as lubricants, antistatic agents, and abrasives.

Examples of suitable lubricants for incorporation into the magnetic layer include silicone oils, fatty acid-modified silicone oils, graphite, fluorinated alcohols, polyolefins (e.g., polyethylene wax), polyglycols (e.g., polyethylene oxide wax), tetrafluoroethylene oxide wax, polytetrafluoroglycol, perfluoro-fatty acids, perfluoro-fatty acid esters, perfluoroalkyl sulfates, perfluoroalkyl phosphates, alkylphosphates, polyphenyl ethers, fatty acids, fatty acid esters, fatty acid amides, and aliphatic alcohols. Preferred among them are fatty acids. The amount of the fatty acid lubricant, if used, is preferably from 0.1 to 5 parts by weight, and more preferably from 0.3 to 4 parts by weight, per 100 parts by weight of the ferromagnetic powder contained in the magnetic layer. If the amount of the fatty acid lubricant is less than 0.1 part, the lubricating effect obtained is small, and the magnetic recording medium is liable to have unstable running properties due to a high coefficient of friction. If the amount of the fatty acid exceeds 5 parts, the magnetic layer is plasticized, and when repeatedly used, the magnetic layer is adhered on the magnetic head and the cylinder and as a result, the output is decreased and the running property is deteriorated and become stable.

Examples of suitable fatty acids for addition to the magnetic layer include capric acid, undecylic acid, lauric acid, myristic acid, palmitic acid, stearic acid, behenic acid, montanic acid, oleic acid, elaidic acid, linoleic acid, linolenic acid, and stearolic acid.

The fatty acid is preferably used in combination with a fatty acid ester. The fatty acid ester is preferably used in an amount of from 0.1 to 5 parts, and particularly from 0.3 to 4 parts, by weight per 100 parts by weight of the ferromagnetic powder contained in the magnetic layer. A preferred weight ratio of fatty acid to fatty acid ester ranges from 1:9 to 9:1. Specific examples of suitable fatty acid esters include butyl myristate, methyl myristate, butyl stearate, ethyl palmitate, butoxyethyl palmitate, and butoxyethyl stearate.

The magnetic layer preferably contains inorganic particles having a Mohs' hardness of 5 or more. The inorganic particles are not particularly limited as long as they have a Mohs' hardness of 5 or more. Examples of suitable inorganic particles are $Al_2O_3$ (Mohs' hardness (hereinafter the same): 9), TiO (6), $TiO_2$ (6.5), $SiO_2$ (7), $SnO_2$ (6.5), $Cr_2O_3$ (9), and $\alpha\text{-}Fe_2O_3$ (5.5). These inorganic particles may be used either individually or in combination thereof. From the standpoint of improvement in running durability, preferred among them are those having a Mohs' hardness of 8 or more. The inorganic particles are preferably added in an amount of from 0.1 to 20 parts by weight, and particularly from 1 to 15 parts by weight, per 100 parts by weight of the ferromagnetic powder contained in the magnetic layer.

The magnetic layer more preferably contains carbon black particles, particularly those having an average particle size of from 10 to 300 m$\mu$.

The amount of the carbon black particles used is preferably 0.1 to 50 parts by weight and more preferably 0.2 to 30 parts by weight, per 100 parts by weight of the ferromagnetic powder.

The total thickness of the magnetic layer is preferably 6 $\mu$m or less and more preferably 4 $\mu$m or less.

A magnetic coating composition for forming a magnetic layer may be prepared by kneading and dispersing a ferromagnetic powder, a binder, and, if desired, additives such as an abrasive, carbon black, and a lubricant, usually together with a solvent. Useful solvents include those commonly employed in the art, such as methyl ethyl ketone, toluene, butyl acetate, and cyclohexanone. The manner of kneading and dispersing is not particularly restricted. The order of addition of the components is appropriately selected by those of ordinary skill in the art.

Kneading and dispersing may be carried out by using a general purpose kneading machine, e.g., a two-rod roll mill, a three-rod roll mill, a ball mill, a sand grinder, an attritor, a high-speed impeller dispersion mixer, a high-speed stone mill, a high-speed impact mill, a disper, a kneader, a high-speed mixer, a homogenizer, and an ultrasonic dispersing machine. For the details of kneading and dispersing steps, reference may be made to T. C. Patton, *Paint Flow and Pigment Dispersion*, John Wiley & Sons (1964) and Tanaka Shin-ichi, *KOGYO ZAIRYO*, Vol. 25, p. 37 (1977). U.S. Pat. Nos. 2,581,414 and 2,855,515 may also be referred to. The magnetic coating composition for use in the present invention can be prepared according to the techniques described in these references.

The thus-prepared magnetic coating composition is coated on the above-described non-magnetic support. Prior to coating, the non-magnetic support may be subjected to a surface treatment, such as a corona discharge treatment, a plasma treatment, an undercoating treatment, a heat treatment, a dust-removing treatment, a metal deposition treatment, an alkali treatment, etc.

A single-layered magnetic layer can be formed by coating the magnetic coating composition by a means of a generally employed coating apparatus, such as a gravure roll coater, a roll coater, a blade coater, and an extrusion coater.

For forming a plurality of magnetic layers, the following coating systems are preferred.

1) A lower magnetic layer is coated with a generally employed coating apparatus, e.g., a gravure coater, a roll coater, a blade coater, and an extrusion coater. After the thus coated lower layer is dried, an upper magnetic layer is coated thereon by means of an extrusion coater as disclosed in JP-B-1-46186, JP-A-60-238179, and JP-A-2-265672 while applying pressure from the non-magnetic support side.

2) A lower magnetic layer is coated with a generally employed coating apparatus, e.g., a gravure coater, a roll coater, a blade coater, and an extrusion coater. While the thus-coated layer is wet, an upper magnetic layer is coated thereon by means of an extrusion coater as disclosed in JP-B-1-46186, JP-A-60-238179, and JP-A-2-265672 while applying pressure from the non-magnetic support side.

3) Lower and upper magnetic layers are coated substantially simultaneously through a single coating head having two slits as disclosed in JP-A-63-88080, JP-A-2-17921, and JP-A-2-265672.

4) Lower and upper magnetic layers are coated substantially simultaneously by means of an extrusion coater equipped with a back-up roll as disclosed in JP-A-2-174965. In order to prevent agglomeration of the ferromagnetic powder which leads to a reduction in electromagnetic characteristics, it is desirable to add a shear to the coating composition inside the coating head as proposed in JP-A-62-95174 and JP-A-1-236968.

The thus-formed magnetic layer is subjected to orientation treatment in a desired direction at a running speed of from 10 to 1000 m/min while, if desired, drying the magnetic powder in the layer immediately after coating. The magnetic layer is then dried at a temperature of from 20° C. to 130° C. If desired, a backing layer may be provided on the non-magnetic support. Thereafter, the magnetic recording medium is subjected to a surface smoothing treatment, followed by cutting to the desired size.

The present invention is now illustrated in greater detail with reference to the following Examples, but it should be understood that the present invention is not deemed to be limited thereto. All parts are by weight unless otherwise indicated.

EXAMPLE

Preparation of Coating Solutions for the Undercoating Layer and Magnetic Layer Compositions a to g for an undercoating layer and compositions A to F for a magnetic layer were prepared as follows.

1) Preparation of Coating Composition for Undercoating Layer:

Two parts each of the resins shown in Table 1 below were dissolved in 100 parts of cyclohexanone in a paddle agitator for 1 hour to prepare Coating Compositions a to f.

TABLE 1

| Composition | Kind | Molecular Weight ($\times 10^4$) | Polar Group | Polar Group Content (meq/g) | Tg (°C.) |
| --- | --- | --- | --- | --- | --- |
| a | polyester (EG/DEG/TP/IP) | 5.4 | —SO$_3$Na | 0.2 | 91 |
| b | polyester (EG/DEG/TP/IP) | 5.0 | " | " | 73 |
| c | polyester (EG/DEG/TP/IP) | 5.3 | " | " | 62 |
| d | polyester (EG/DEG/TP/IP) | 4.8 | " | " | 45 |
| e | polyester (EG/DEG/TP/IP) | 4.9 | " | " | 30 |
| f | polyurethane (EG/TEG/MDI) | 4.5 | —COONa | 0.2 | 70 |
| g | STAFIX | 5.0 | — | — | 28 |

Note:
EG: Ethylene glycol
DEG: Diethylene glycol
TP: Terephthalic acid
IP: Isophthalic acid
TEG: Tetraethylene glycol
MDI: Diphenylmethane diisocyanate
STAFIX: A trade name of polyester produced by the Fuji Photo Film Co., Ltd.

2) Preparation of Coating Composition for the Magnetic Layer:

| Composition A: | |
| --- | --- |
| Ferromagnetic alloy powder (coercive force: 1600 Oe; crystallite size: 215 Å; S$_{BET}$: 58 m$^2$/g) | 100 parts |
| Vinyl chloride copolymer ("MR-110" produced by Japanese Zeon Co., Ltd.) | 15 parts |
| Polyester polyurethane ("UR-5500" produced by Toyobo Co., Ltd.) | 5 parts |
| Polyisocyanate ("Coronate L" produced by Nippon Polyurethane Co., Ltd.) | 6.7 parts |
| Myristic acid (industrial grade) | 2 parts |
| Butyl stearate (industrial grade) | 1 part |
| α-Alumina (particle size: 0.1 μm) | 5 parts |
| Carbon black (average particle size: 80 mμ) | 1 part |
| Methyl ethyl ketone | 200 parts |
| Cyclohexanone | 100 parts |
| Composition B: | |
| Co-γ-FeO$_x$ (coercive force: 800 Oe; crystallite size: 308 Å; S$_{BET}$: 43 m$^2$/g) | 100 parts |
| Vinyl chloride copolymer "MR-110" | 15 parts |
| Polyester polyurethane "UR-5500" | 5 parts |
| Polyisocyanate "Coronate L" | 6.7 parts |
| Myristic acid (industrial grade) | 2 parts |
| Butyl stearate (industrial grade) | 1 part |
| Carbon black (average particle size: 80 mμ) | 3 parts |
| Methyl ethyl ketone | 160 parts |
| Cyclohexanone | 80 parts |

Composition C:

The same as composition A, except for replacing the ferromagnetic alloy powder with Co-γ-FeO$_x$ (coercive force: 800 Oe; crystallite size: 308 Å; S$_{BET}$: 48 m$^2$/g).

Composition D:

The same as composition A, except for replacing the vinyl chloride copolymer "MR-110" with "VAGH" produced by Union Carbide Co., and replacing the polyester polyurethane "UR-5500" with "N-2301" produced by Nippon Polyurethane Co., Ltd.

Composition E:

The same as composition B, except for replacing the vinyl chloride copolymer "MR-110" with "VAGH" produced by Union Carbide Co., and replacing the polyester polyurethane "UR-5500" with "N-2301" produced by Nippon Polyurethane Co., Ltd.

Composition F:

The same as composition C, except for replacing the vinyl chloride copolymer "MR-110" with "VAGH" produced by Union Carbide Co., and replacing the polyester polyurethane "UR-5500" with "N-2301" produced by Nippon Polyurethane Co., Ltd.

Each of the above compositions was thoroughly mixed and dispersed to prepare Coating Compositions A to F for a magnetic layer.

EXAMPLE 1

Each of respective coating compositions a to g for an undercoating layer was coated on a separate polyethylene terephthalate supports having a thickness of 7 μm, respectively. Then, Composition A and Composition B were coated thereon to form an upper layer having a thickness of 0.5 μm and a lower layer having a thickness of 1.5 μm, respectively, to prepare Samples 101 to 107 (total magnetic layer thickness: 2 μm).

A backing layer having the following composition was coated on the opposite side of the support, followed by calendering.

| Backing Layer Composition: | |
| --- | --- |
| Carbon black (average particle size: 17 mμ) | 100 parts |
| Carbon black (average particle size: 300 mμ) | 3 parts |
| Nitrocellulose | 100 parts |

-continued

Backing Layer Composition:

| Polyurethane | 25 parts |
|---|---|
| Polyisocyanate | 25 parts |
| Methyl ethyl ketone | 500 parts |
| Toluene | 10 parts |

Each of the samples was slit to a width of 8 mm and loaded in a 8-mm video cassette.

The resulting video tapes were evaluated according to the following test methods 1) to 4). The results obtained are shown in Table 2 below.

1) Adhesive Strength:

An adhesive tape was adhered onto the magnetic layer, and the sample tape was peeled off at an angle of 180° to evaluate adhesive strength.

2) Edgewise Abrasion Resistance:

The sample tape was run on a video tape recorder "EV-S33" manufactured by Sony Corp. for 50 passes, and edgewise abrasion was observed and evaluated as follows.

Good . . . No edgewise abrasion was observed.
Medium . . . Slight edgewise abrasion was observed.
Bad . . . Considerable edgewise abrasion was observed.

3) Anti-blocking:

Ten sheets of the non-magnetic support having coated thereon the undercoating layer were superposed on each other and stored at 50° C. for 24 hours under a load of 100 g. Blocking among the supports was observed and evaluated as follows.

Good . . . The non-magnetic supports under-coated were not entirely adhered each other.
Medium . . . The non-magnetic supports under-coated were slightly adhered each other.
Bad . . . The non-magnetic support under-coated were perfectly or partially adhered each other.

4) Solubility:

The sample tape was immersed in a 2% solution of cyclohexanone and methyl ethyl ketone (8:2 by weight) at −5° C. for 24 hours to see if a precipitate was formed. The observation result was evaluated as follows.

Good . . . No turbidity was observed.
Medium . . . Slight turbidity was observed (translucency).
Bad . . . Significant turbidity was observed (generation of white precipitation).

polyurethane resin in an undercoating layer provides a remarkable improvement in adhesion and resistance to edgewise abrasion. It is also seen that the polar group-containing at least one of a polyester and polyurethane resin should have a Tg of from 40° to 80° C. for obtaining good anti-blocking properties and solvent solubility.

EXAMPLE 2

Polyethylene terephthalate (PET), polyethylene naphthalate (PEN), and polyamide (PA) film supports, having a thickness of 7 μm, each was coated with the coating composition for an undercoating layer shown in Table 3 below. Then, a single magnetic layer or dual magnetic layers were formed thereon using the composition shown in Table 3 in the respective dry thickness as indicated. The same backing layer as used in Example 1 was formed on the surface of the support opposite to the magnetic layer to obtain Samples 201 to 238.

Samples 201 to 216 and 224 to 239 were slit to a width of 8 mm and loaded in a 8-mm vide cassette. Samples 217 to 223 were slit to a width of ½ in and loaded in a VHS video cassette.

Each of the samples were evaluated according to test methods 1) and 2) described in Example 1 and also according to the following test methods 5) to 8). Measurements were made on the VTR "EV-S33" (manufactured by Sony Corp.) for 8-mm tapes and "NV-G40" (manufactured by Matsushita Electric Industrial Co., Ltd.) for ½-in tapes. The results obtained are shown in Table 4.

5) Video Sensitivity (Y.S):

Video signals were recorded on the sample, and the reproduction output level was determined and expressed relative to the output level of a comparative SHG-8 mm tape or SHG-VHS tape (both manufactured by Fuji Photo Film Co., Ltd.) as 0 dB.

6) Video S/N (Y S/N):

The S/N ratio of video signals was determined and expressed relative to that of the same SHG 8-mm tape or SHG-VHS tape as used in 5) above as a standard (0 dB).

7) Chroma Output (Chroma Sensitivity) (C.S):

Chroma signals were recorded on the sample, and the reproduction output level was determined and expressed relatively in the same manner as in 5) above.

8) Chroma S/N (C S/N):

The S/N ratio of chroma signals was determined and expressed relatively in the same manner as in 5) above.

TABLE 2

| Sample No. | Undercoating Layer Composition | Resin of Subbing Layer | | | | | | | | |
|---|---|---|---|---|---|---|---|---|---|---|
| | | Kind | Polar Group | Polar Group Content (meq/g) | Molecular Weight (× 10⁴) | Tg (°C.) | Solubility | Anti-Blocking | Adhesive Strength (g) | Edgewise Abrasion Resistance |
| 101 | a | polyester (EG/DEG/TP/IP) | —SO₃Na | 0.2 | 5.4 | 91 | bad | good | 182 | good |
| 102 | b | polyester (EG/DEG/TP/IP) | " | " | 5.0 | 73 | good | good | 165 | good |
| 103 | c | polyester (EG/DEG/TP/IP) | " | " | 5.3 | 62 | good | good | 159 | good |
| 104 | d | polyester (EG/DEG/TP/IP) | " | " | 4.8 | 45 | good | good | 135 | good |
| 105 | e | polyester (EG/DEG/TP/IP) | " | " | 4.9 | 30 | good | bad | 130 | good |
| 106 | f | polyurethane (EG/TEG/MDI) | —COONa | 0.2 | 4.5 | 70 | good | good | 160 | good |
| 107 | g | STAFIX | — | — | 5.0 | 28 | good | bad | 49 | medium |

As is apparent from the results of Table 2, use of at least one of the polar group-containing polyester and

TABLE 3

| Sample No. | Under-coating Layer Composition | Magnetic Layer Upper Layer Composition | Upper Layer Polar Group | Upper Layer Magnetic Powder | Upper Layer Thickness (μm) | Lower Layer Composition | Lower Layer Polar Group | Lower Layer Magnetic Powder | Lower Layer Thickness (μm) | Total Thickness (μm) | Support |
|---|---|---|---|---|---|---|---|---|---|---|---|
| 201 | c | — | — | — | — | A | —OSO₃K/—SO₃Na | alloy | 2 | 2 | PET |
| 202 | " | — | — | — | — | " | —OSO₃K/—SO₃Na | " | 5 | 5 | " |
| 203 | g | — | — | — | — | " | —OSO₃K/—SO₃Na | " | 2 | 2 | " |
| 204 | " | — | — | — | — | " | —OSO₃K/—SO₃Na | " | 5 | 5 | " |
| 205 | c | — | — | — | — | D | none | " | 2 | 2 | " |
| 206 | " | — | — | — | — | " | " | " | 5 | 5 | " |
| 207 | g | — | — | — | — | " | " | " | 2 | 2 | " |
| 208 | " | — | — | — | — | " | " | " | 5 | 5 | " |
| 209 | c | — | — | — | — | C | —OSO₃K/—SO₃Na | Co-γ-FeOₓ | 2 | 2 | " |
| 210 | " | — | — | — | — | " | —OSO₃K/—SO₃Na | " | 5 | 5 | " |
| 211 | g | — | — | — | — | " | —OSO₃K/—SO₃Na | " | 2 | 2 | " |
| 212 | " | — | — | — | — | " | —OSO₃K/—SO₃Na | " | 5 | 5 | " |
| 213 | c | — | — | — | F | none | —OSO₃K/—SO₃Na | 2 | 2 | " |
| 214 | " | — | — | — | — | " | —OSO₃K/—SO₃Na | " | 5 | 5 | " |
| 215 | g | — | — | — | — | F | none | Co-γ-FeOₓ | 2 | 2 | PET |
| 216 | " | — | — | — | — | " | " | " | 5 | 5 | " |
| 217 | c | A | —OSO₃K/—SO₃Na | Alloy | 0.5 | B | —OSO₃K/—SO₃Na | " | 1.5 | 2 | " |
| 218 | " | " | —OSO₃K/—SO₃Na | " | " | " | —OSO₃K/—SO₃Na | " | 3.5 | 5 | " |
| 219 | " | " | —OSO₃K/—SO₃Na | " | " | " | —OSO₃K/—SO₃Na | " | 1.5 | 2 | PEN |
| 220 | " | " | —OSO₃K/—SO₃Na | " | " | " | —OSO₃K/—SO₃Na | " | 3.5 | 5 | " |
| 221 | " | " | —OSO₃K/—SO₃Na | " | " | " | —OSO₃K/—SO₃Na | " | 1.5 | 2 | PA |
| 222 | " | " | —OSO₃K/—SO₃Na | " | " | " | —OSO₃K/—SO₃Na | " | 3.5 | 5 | " |
| 223 | f | " | —OSO₃K/—SO₃Na | " | " | " | —OSO₃K/—SO₃Na | " | 1.5 | 2 | PET |
| 224 | " | " | —OSO₃K/—SO₃Na | " | " | " | —OSO₃K/—SO₃Na | " | 3.5 | 5 | " |
| 225 | g | " | —OSO₃K/—SO₃Na | " | " | " | —OSO₃K/—SO₃Na | " | 1.5 | 2 | " |
| 226 | " | " | —OSO₃K/—SO₃Na | " | " | " | —OSO₃K/—SO₃Na | " | 3.5 | 5 | " |
| 227 | " | " | —OSO₃K/—SO₃Na | " | " | " | —OSO₃K/—SO₃Na | " | 1.5 | 2 | PEN |
| 228 | " | " | —OSO₃K/—SO₃Na | " | " | " | —OSO₃K/—SO₃Na | " | 3.5 | 5 | " |
| 229 | " | " | —OSO₃K/—SO₃Na | " | " | " | —OSO₃K/—SO₃Na | " | 1.5 | 2 | PA |
| 230 | " | " | —OSO₃K/—SO₃Na | " | " | " | —OSO₃K/—SO₃Na | " | 3.5 | 5 | " |
| 231 | c | A | —OSO₃K/—SO₃Na | alloy | 0.5 | E | none | Co-γ-FeOₓ | 1.5 | 2 | PET |
| 232 | " | " | —OSO₃K/—SO₃Na | " | " | " | " | " | 3.5 | 5 | " |
| 233 | g | " | —OSO₃K/—SO₃Na | " | " | " | " | " | 1.5 | 2 | " |
| 234 | " | " | —OSO₃K/—SO₃Na | " | " | " | " | " | 3.5 | 5 | " |
| 235 | c | D | none | " | 0.5 | B | —OSO₃K/—SO₃Na | " | 1.5 | 2 | " |
| 236 | " | " | " | " | " | " | —OSO₃K/—SO₃Na | " | 3.5 | 5 | " |
| 237 | g | " | " | " | " | " | —OSO₃K/—SO₃Na | " | 1.5 | 2 | " |
| 238 | " | " | " | " | " | " | —OSO₃K/—SO₃Na | " | 3.5 | 5 | " |

Examples of the present invention: Sample Nos. 201, 202, 209 and 210
Comparative Examples: Sample Nos. 203 to 208 and 211 to 216

TABLE 4

| Sample No. | Adhesive Strength (g) | Edgewise Abrasion Resistance | Y.S (dB) | Y S/N (dB) | Chroma Sensitivity (dB) | Chroma S/N (dB) |
| --- | --- | --- | --- | --- | --- | --- |
| 201 | 182 | good | 0.7 | 0.3 | 0.1 | 0.2 |
| 202 | 167 | good | 0.8 | 0.4 | 0.5 | 0.5 |
| 203 | 90 | medium | 0.5 | 0.3 | 0.1 | 0.1 |
| 204 | 20 | bad | 0.7 | 0.3 | 0.4 | 0.4 |
| 205 | 98 | medium | 0 | −0.2 | −0.3 | −0.2 |
| 206 | 27 | bad | 0.1 | −0.2 | −0.1 | 0 |
| 207 | 45 | medium | −0.1 | −0.3 | −0.3 | −0.3 |
| 208 | 8 | bad | 0 | −0.3 | −0.2 | −0.1 |
| 209 | 205 | good | 0.5 | 0.2 | 0.2 | 0.4 |
| 210 | 198 | good | 0.4 | 0.3 | 0.5 | 0.6 |
| 211 | 95 | medium | 0.4 | 0.2 | 0.2 | 0.2 |
| 212 | 21 | bad | 0.4 | 0.2 | 0.4 | 0.5 |
| 213 | 84 | medium | −0.1 | −0.2 | −0.2 | −0.1 |
| 214 | 23 | bad | 0 | −0.2 | 0 | 0.4 |
| 215 | 40 | medium | 0 | −0.3 | −0.3 | −0.1 |
| 216 | 15 | bad | −0.1 | −0.2 | −0.1 | 0.2 |
| 217 | 199 | good | 2.5 | 1.3 | 2.6 | 1 |
| 218 | 187 | good | 2.6 | 1.4 | 3 | 1.5 |
| 219 | 177 | good | 2.8 | 1.4 | 2.7 | 1.1 |
| 220 | 162 | good | 2.9 | 1.5 | 3.1 | 1.6 |
| 221 | 158 | good | 2.9 | 1.4 | 2.8 | 1.2 |
| 222 | 149 | good | 3 | 1.5 | 3 | 1.6 |
| 223 | 195 | good | 2.4 | 1.2 | 2.5 | 1 |
| 224 | 148 | good | 2.5 | 1.3 | 3 | 1.5 |
| 225 | 91 | medium | 2.3 | 1.2 | 2.5 | 0.9 |
| 226 | 18 | bad | 2.5 | 1.3 | 2.8 | 1.4 |
| 227 | 66 | medium | 2.4 | 1.2 | 2.5 | 1 |
| 228 | 12 | bad | 2.6 | 1.3 | 2.8 | 1.3 |
| 229 | 35 | medium | 2.5 | 1.2 | 2.6 | 1 |
| 230 | 10 | bad | 2.6 | 1.3 | 2.7 | 1.4 |
| 231 | 60 | medium | 1.8 | 0.8 | 2 | 0.5 |
| 232 | 15 | bad | 1.9 | 0.9 | 2.3 | 0.9 |
| 233 | 45 | medium | 1.7 | 0.7 | 2 | 0.4 |
| 234 | 11 | bad | 1.7 | 0.8 | 2.1 | 0.7 |
| 235 | 178 | good | 1 | 0.5 | 1.5 | 0.3 |
| 236 | 165 | good | 1.2 | 0.7 | 1.7 | 0.5 |
| 237 | 87 | medium | 0.9 | 0.4 | 1.3 | 0.2 |
| 238 | 15 | bad | 1.1 | 0.6 | 1.5 | 0.4 |

Examples of the present invention: Sample Nos. 217 to 224

Comparative Examples: Sample Nos. 225 to 238

As is apparent from the results of Tables 3 and 4, adhesion is improved by using a polar group-containing polyester or polyurethane resin as an undercoating layer. When a magnetic layer adjacent to the undercoating layer contains a polar group-containing binder resin, the improvement in adhesion is further enhanced, and the reduction in adhesion with an increase in magnetic layer thickness can be minimized. On the other hand, although a conventional undercoating layer has a slightly higher adhesion when the magnetic layer is thin, the adhesion is considerably reduced when the magnetic layer has an increased thickness. When the magnetic recording medium has a plurality of magnetic layers, and while high adhesion can be obtained by incorporating the polar group-containing binder resin only into the lower layer in contact with the undercoating layer as in Samples 235 and 236, the improvement in adhesion is further enhanced by incorporating the polar group-containing binder resin also into the upper layer as in Samples 217 to 224. As the adhesion is improved, edgewise abrasion resistance is also improved.

It is also seen that introduction of a polar group into a magnetic layer or plurality of magnetic layers provides improved electromagnetic characteristics. In particular, samples having a plurality of magnetic layers each containing a polar group exhibit satisfactory electromagnetic characteristics.

It has also been shown that sufficient adhesion characteristics can be obtained even when using a hard non-magnetic support, such as a polyethylene naphthalate film and a polyamide film.

Thus, the magnetic recording medium of the present invention exhibits high adhesion independent of the number of magnetic layers, while also providing excellent durability and satisfactory electromagnetic characteristics.

As described, and demonstrated above, the present invention provides a magnetic recording medium comprising a non-magnetic support having provided thereon a magnetic layer with an undercoating layer therebetween, wherein the undercoating layer contains a polar group-containing polyester or polyurethane resin having a Tg of from 40° C. to 80° C., and the magnetic layer contains a polar group-containing binder resin. The magnetic recording medium of the present invention exhibits excellent adhesion of the undercoating layer to both the non-magnetic support and the magnetic layer, high running durability, and excellent electromagnetic characteristics. More specifically, the magnetic recording medium provides excellent adhesion, resistance to edgewise abrasion, anti-blocking, and electromagnetic characteristics inclusive of video sensitivity, video S/N, chroma sensitivity, and chroma S/N.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having provided thereon at least one magnetic layer comprising a ferromagnetic powder dispersed in a binder and an undercoating layer having a dry thickness of from 0.01 to 0.1 μm disposed between the non-magnetic support and the at least one magnetic layer, wherein the undercoating layer consists essentially of a polyester resin or polyurethane resin having at least one polar group selected from the group consisting of $-SO_3M$, $-OSO_3M$, $-COOM$, and $-OPO_3M_2$ (wherein M represents a hydrogen atom, an alkali metal, or an ammonium base, and M in different polar groups or plural M's within the polar group $-OPO_3M_2$ may be the same or different) and having a glass transition temperature (Tg) of from 40° to 80° C.; the magnetic layer contains a binder resin having at least one polar group selected from the group consisting of $-SO_3M$ and $-OSO_3M$, wherein M represents a hydrogen atom, an alkali metal, or an ammonium base; the non-magnetic support is selected from the group consisting of polyethylene terephthalate, polyethylene naphthalate and polyamide; and the undercoating layer is in contact with the non-magnetic support.

2. A magnetic recording medium as in claim 1, comprising a plurality of magnetic layers each containing a binder resin having at least one polar group selected from the group consisting of $-SO_3M$ and $-OSO_3M$.

3. A magnetic recording medium as in claim 1 comprising a plurality of magnetic layers, the uppermost magnetic layer contains a ferromagnetic alloy powder, and the lowermost magnetic layer contains a Co-containing iron oxide powder.

4. A magnetic recording medium as in claim 2, wherein the plurality of magnetic layers comprises the uppermost magnetic layer containing a ferromagnetic alloy powder and the lowermost magnetic layer containing a Co-containing iron oxide powder.

5. A magnetic recording medium as in claim 1, wherein said polar group content of the polyester or polyurethane resin of the undercoating layer ranges from 0.1 to 3 meq/g.

6. A magnetic recording medium as in claim 1, wherein the binder resin of the at least one magnetic layer comprises a vinylchloride-based copolymer containing repeating units having said at least one polar group in an amount of from 0.001 to 5.0 mol %.

7. A magnetic recording medium as in claim 1, wherein the binder resin of the at least one magnetic layer comprises a polyurethane resin containing a repeating unit having said at least one polar group in an amount of from 0.001 to 5.0 mol %.

8. A magnetic recording medium as in claim 1, wherein the binder of the at least one magnetic layer comprises a vinylchloride-based copolymer having said at least one polar group and a polyurethane resin having a polar group in a weight ratio of from 35:65 to 80:20, respectively.

* * * * *